United States Patent [19]

Hasegawa et al.

[11] 4,406,530
[45] Sep. 27, 1983

[54] REFLECTING TYPE OVERHEAD PROJECTOR WITH AUTOMATICALLY VARIABLE SAFETY ILLUMINATION

[75] Inventors: Takanori Hasegawa, Hachioji; Susumu Oshio, Tokyo, both of Japan

[73] Assignee: Riso Kagaku Corporation, Tokyo, Japan

[21] Appl. No.: 371,282

[22] Filed: Apr. 23, 1982

[30] Foreign Application Priority Data

May 12, 1981 [JP] Japan .................................. 56-70991

[51] Int. Cl.³ ............................................ G03B 21/06
[52] U.S. Cl. ...................................... 353/66; 353/85; 353/DIG. 4; 250/221
[58] Field of Search ..................... 353/66, 85, DIG. 3, 353/DIG. 4, 63, 64, 98; 250/205, 221, 215; 362/20, 295, 276, 802, 803

[56] References Cited

U.S. PATENT DOCUMENTS 3,762,809 10/1973 Kato et al. .............................. 353/66
3,833,297 9/1974 Swartz .................................... 353/85

*Primary Examiner*—Stephen Marcus
*Assistant Examiner*—William R. Sharp
*Attorney, Agent, or Firm*—Birch, Stewart, Kolasch & Birch

[57] ABSTRACT

In a reflecting type overhead projector having a light source lamp and a projection lens above a reflecting table formed of a Fresnel lens and a mirror upon which an original to be projected is laid, there is provided a control circuit which switches over supply of electric power to the light source lamp between full and part power supply according to whether the intensity of the light beams from the light source lamp received by a photosensitive element provided in the vicinity of the reflecting table is higher or lower than a predetermined value.

7 Claims, 6 Drawing Figures

REFLECTING TYPE OVERHEAD PROJECTOR WITH AUTOMATICALLY VARIABLE SAFETY ILLUMINATION

BACKGROUND OF THE INVENTION

The present invention relates to an overhead projector, and more specifically relates to an overhead projector of a so called reflecting type in which the light source lamp is on the same side of the original to be projected as is the projection lens.

Overhead projectors are currently in wide use nowadays in various business, scientific, and educational establishments as simple, inexpensive, and convenient enlarging projection devices. Typically, an overhead projector has more flexibility during use than does a slide projector, and is usually used for simultaneously projecting an enlarged image of an original image which is being drawn by the hand of the operator on an original image plate or film which is resting upon a mounting table. Thus a lecturer can illustrate a lecture by making a drawing on said original plate or film in an ongoing fashion, elaborating various parts of the drawing as his lecture proceeds, for example.

The known types of overhead projectors are through type overhead projectors and reflecting type overhead projectors. The general form of overhead projector in use nowadays is a through type overhead projector, in which the light source lamp which illuminates the original is on the opposite side of the original from the projection lens which forms the projected image; in other words, the light rays for forming the image pass from the light source lamp on one side of the original, through the original, to the projection lens on the other side of the original. Typically, just below the original there is placed a Fresnel lens, on the horizontally disposed flat upper surface of which the original rests, and this Fresnel lens concentrates the light from the light source lamp so as to illuminate the original more strongly. Typically the projection lens is mounted on a frame above the original as it rests on this Fresnel lens, and further, typically, near the projection lens there is mounted a planar deflecting mirror for deflecting the path of the light rays which will form the image on the screen through an angle of approximately 90°, so that these rays shine substantially in the horizontal direction to impinge upon the substantially vertically mounted screen, which is apart from and in front of the projector.

On the other hand, a so called reflecting type overhead projector has been heretofore known for a long time, but has until recently not been in wide use. In such a reflecting type overhead projector, the light source lamp which illuminates the original is on the same side of the original as the projection lens which forms the projected image; in other words, the light rays for forming the image pass from the light source lamp on one (usually the upper) side of the original, through the original, are reflected off a mirror just below the original, pass through the original again, and then pass to the projection lens on the same side of the original as the light source lamp. Typically, just below the original, between it and the reflecting mirror, there is again placed a Fresnel lens on the horizontally disposed flat upper surface of which the original rests, and this Fresnel lens again concentrates the light from the light source lamp so as to illuminate the original more strongly. Typically the projection lens is mounted on a frame above the original as it rests on this Fresnel lens, and again near the projection lens there is mounted a planar deflecting mirror for deflecting the path of the light rays which will form the image on the screen through an angle of approximately 90°, so that these rays shine substantially in the horizontal direction to impinge upon the substantially vertically mounted screen, which is again provided as apart from and in front of the projector.

In this connection, as a modification of the reflecting type overhead projector itself, it is considered that the lower flat surface of the Fresnel lens may be covered with a mirror coating so that the Fresnel lens and the reflecting mirror are formed as a unitary element, or alternatively the combination of the Fresnel convex lens and the reflecting mirror is replaced by a Fresnel concave mirror which has a reflecting surface on the grooved upper surface thereof. It is to be understood that these modifications should be included in the concept of the reflecting type overhead projector of which the improvement by the present invention is contemplated, as will be seen hereinafter. In any case, the function of the reflecting table in which a Fresnel lens and a reflecting mirror, or alternatively a Fresnel mirror, are incorporated is analogous to that of a concave mirror.

This configuration of reflecting type overhead projector is reasonably serviceable, and has the advantage that very little space is needed between the original and the lower part of the projector, and is thus simpler, lighter, and more compact than the above described type of through overhead projector; and further, since the light source lamp is located in the projector head, i.e. above the original, near the projection lens, out in the open, cooling of the light source lamp can be accomplished much more easily, without any danger that the rising heat from the lamp should damage the original; but such reflecting type overhead projectors have in the past suffered from the disabling problem that no good multilayer composite formed of a Fresnel lens and a reflecting mirror, of sufficiently high reflectivity, has been commercially available. Accordingly, up until recently, the reflecting type overhead projector configuration has not been in wide use.

However, recently a good multilayer composite formed of a Fresnel lens and a reflecting mirror, of very adequately high reflectivity, has become commercially available, and accordingly the reflecting type overhead projector has become a practicable and useful type, especially in virtue of its inherent advantages as previously explained. However, a new problem has become recognized and troublesome with respect to such a reflecting type overhead projector configuration, as follows.

Since in the reflecting type overhead projector configuration the light source lamp, which is necessarily quite powerful, is located above the original and shines directly downwards onto said original, a danger exists of the hand of the projector operator being burned, if the operator should put his hand into the path of the light rays. Since, as mentioned above, one of the principal operational modes of such an overhead projector is for simultaneously projecting an enlarged image of an original image which is being drawn by the hand of the operator on the original, for example when a lecturer is explaining a lecture by making a drawing on the original in an ongoing fashion for elaborating various parts of the drawing as his lecture proceeds, such a putting of the operator's hand into the path of the light rays shining from the light source lamp onto the original is quite likely and common. Accordingly, the very real danger of burning of the operator's hand should be protected against, in some way, if the reflecting type overhead projector configuration is to be viable. However, merely reducing the power of the light source lamp in order to avoid such burning of the operator's hand is not a proper way to handle the problem, since brightness of the projected image on the screen is very important, from the point of view of performance of the overhead projector system as a whole.

SUMMARY OF THE INVENTION

Accordingly, it is the primary object of the present invention to provide an overhead projector of the reflecting type, which provides good safety.

It is a further object of the present invention to provide an overhead projector of the reflecting type, which avoids the danger of burning the operator's hand during use of the projector.

It is a further object of the present invention to provide an overhead projector of the reflecting type, which is practical to use in the operational mode of simultaneously projecting an enlarged image of an original image which is being drawn by the hand of the operator on the original, without danger to the operator.

It is a further object of the present invention to provide an overhead projector of the reflecting type, in which the light source lamp is dimmed whenever the hand of the operator is intercepted into the path of the light rays from the light source lamp to the original, above the original.

It is a further object of the present invention to provide an overhead projector of the reflecting type, in which the light source lamp is dimmed whenever the hand of the operator is intercepted into the path of the light rays from the light source lamp to the original, above the original, and in which thereafter the light source lamp is brightened again whenever the hand of the operator is removed from the path of the light rays from the light source lamp to the original.

It is a further object of the present invention to provide an overhead projector of the reflecting type, which provides good safety for the operator, and which yet does not require any very great space to be available between the original and the lowest part of the projector.

It is yet a further object of the present invention to provide an overhead projector of the reflecting type, which provides good safety for the operator, and yet which is light.

It is yet a further object of the present invention to provide an overhead projector of the reflecting type, which provides good safety for the operator, and yet which is compact.

It is yet a further object of the present invention to provide an overhead projector of the reflecting type, which provides good safety for the operator, and yet which is simple in construction.

According to the present invention, these and other objects are accomplished by a reflecting type overhead projector, for projecting an image of an at least partly transparent original upon a screen, comprising: a reflecting table for placing said original thereupon; a light source lamp for projecting light rays towards said reflecting table, for illuminating said original when it is thus placed upon said reflecting table; a projection lens for projecting an image of said original, when it is thus placed upon said reflecting table and illuminated by said light source lamp, upon said screen; a photosensitive element in the vicinity of said reflecting table for responding to the intensity of light rays which said photosensitive element receives from said light source lamp; and a control circuit which receives a signal from said photosensitive element, and which controls the intensity of the light emitted by said light source lamp; and which, when said light source lamp is being supplied with full power so as to light it more brightly, and then the intensity of light radiation received by said photosensitive element drops substantially, supplies part power to said light source lamp so as to light it less brightly; and, when said light source lamp is being supplied with part power so as to light it less brightly, and then the intensity of light radiation received by said photosensitive element rises substantially, supplies full power to said light source lamp so as to light it more brightly.

According to such a structure, when the operator of this overhead projector puts his hand down in between the light source lamp and the original, as for example to modify or to add to the original, then the intensity of light radiation received by said photosensitive element drops substantially, and thus said control circuit will supply part power to said light source lamp so as to light it less brightly. Thus the danger of the operator's hand being burnt by the full intensity of the bright light from the light source lamp is prevented. On the other hand, when from this dimmed lamp condition the intensity of light radiation received by said photosensitive element rises substantially, i.e. when the operator's hand is withdrawn from between the light source lamp and the original, then said control circuit again supplies full power to said light source lamp so as to light it more brightly, thus restoring full power lighting of the original so as to project a properly bright image upon the screen.

According to the present invention, these and other objects are more particularly accomplished by a reflecting type overhead projector, for projecting an image of an at least partly transparent original upon a screen, comprising: a reflecting table for placing said original upon; a light source lamp for projecting light rays towards said reflecting table, for illuminating said original when it is thus placed upon said reflecting table; a projection lens for projecting an image of said original, when it is thus placed upon said reflecting table and illuminated by said light source lamp, upon said screen; a photosensitive element in the vicinity of said reflecting table for responding to the intensity of light rays which said photosensitive element receives from said light source lamp; and a control circuit which receives a signal from said photosensitive element, and which controls the intensity of the light emitted by said light source lamp; said source lamp supplying full or part power to said light source lamp, lighting said light source lamp more or less brightly, respectively when the intensity of light radiation received by said photosensitive element is higher than a certain predetermined value, or drops to less than said certain predetermined value; the intensity of light radiation received by said photosensitive element with the light path between said light source lamp and said photosensitive element being substantially unobstructed, when said light source lamp is thus supplied with part power and is less brightly lit, being higher than said certain predetermined value.

overhead projector according to either of these two preferred embodiments of the present invention;

FIG. 4 is a diagram of the wave form of an alternating voltage supply for the light source lamp, said voltage supply being controlled by the circuit shown in FIG. 2, showing the condition of energy supply to said light source lamp, when said light source lamp is being operated at full intensity; and FIG. 5 is a diagram, similar to FIG. 4, of the wave form of said alternating voltage supply for the light source lamp, showing the condition of energy supply to said light source lamp, when said light source lamp is being operated at partial intensity.

DESCRIPTION OF THE PREFERRED EMBODIMENTS

The present invention will now be described with reference to two preferred embodiments thereof, and with reference to the appended drawings. FIG. 1a is a schematic sectional view taken in a vertical plane through an overhead projector which is a first preferred embodiment of the present invention. On a base designated by the reference numeral 1, which is quite a thin base, there is mounted a reflective table 2 composed of a mirror on its lower side and a Fresnel lens on its upper side, neither of which are particularly shown in the figure, and adapted to operate as if it were a concave mirror as a whole. A support pillar 3 is fixed at its lower end to the base 1, and is fixed at its upper end to and supports a projection head 4. The projection head 4 is provided with a light source lamp 5, a projection lens 6, and a deflection mirror 7.

An original 8 which is made of a thin transparent film having an image formed upon it, for example a colored or frost image formed by colored dyes or heat shrinkage treatment, is placed upon the reflecting table 2, and light from the light source lamp 5 shines upon this original 8. This light, in order, passes through the original 8 from its upper side to its lower side, passes through the Fresnel lens incorporated in the reflecting table 2 also from its upper side to its lower side, is reflected upwards from the mirror incorporated in the reflecting table 2, passes through the Fresnel lens again from its lower side to its upper side this time, passes through the original 8 again from its lower side to its upper side this time, and emerges from the upper side of the original 8 after having been concentrated by the Fresnel lens in a per se well known way. Then this light is refracted by the projection lens 6 (which can be adjusted in a per se conventional way) and is deflected by the deflection mirror 7 to be projected to the right as seen in the figure, so as to form an enlarged image of the original 8 on a screen mounted substantially vertically to the right of the figure, said screen not being particularly shown.

As the present invention has been outlined above in the section entitled "BACKGROUND OF THE INVENTION", since in this reflecting type overhead projector configuration the light source lamp 5, which is necessarily quite powerful, is located above the original 8 and shines directly downwards onto said original 8, a danger exists of the hand of the projector operator being burned, if the operator should put his hand into the path of the light rays, as schematically shown in FIG. 1a by the drawing of the operator's hand. Therefore, according to the present invention, a system is provided for controlling the brightness of the light emitted by said light source lamp 5, as will now be described.

A photoelectric element 9, which in this first preferred embodiment is exemplarily a CdS photoelectric cell, is located in the vicinity of the reflecting table 2. In fact, in this first preferred embodiment of the overhead projector according to the present invention, the photoelectric element 9 is located under the reflecting table 2, just below a small hole 10 formed through said reflecting table 2, so that said photoelectric element 9 can receive light from above said reflecting table 2. The photoelectric element 9 provides its signal, via a signal line schematically shown by the reference numeral 11, to a control circuit 12, which in turn provides actuating electrical energy to the light source lamp 5, via a signal line schematically shown by the reference numeral 13.

The function of the control circuit 12 may be broadly defined as follows. The control circuit 12 receives a signal from said photoelectric element 9, and controls the intensity of the light emitted by said light source lamp 5, thus: when said light source lamp 5 is being supplied with full power so as to light it more brightly, and then the intensity of light radiation received by said photoelectric element 9 drops substantially, supplying part power to said light source lamp 5 so as to light it less brightly; and, when said light source lamp 5 is being supplied with part power so as to light it less brightly, and then the intensity of light radiation received by said photoelectric element 9 rises substantially, supplying full power to said light source lamp 5 so as to light it more brightly. In more detailed terms, the control circuit 12 alternatively supplies full or part power to said light source lamp 5, lighting said light source lamp 5 more or less brightly, respectively according to whether the intensity of light radiation received by said photoelectric element 9 is higher than said certain predetermined value, or drops to less than said certain predetermined value; the intensity of light radiation received by said photoelectric element 9 with the light path between said light source lamp 5 and said photoelectric element 9 being substantially unobstructed, when said light source lamp 5 is thus supplied with part power and is less brightly lit, being higher than said certain predetermined value.

The construction of the control circuit 12, in both the first preferred embodiment of the overhead projector according to the present invention shown in FIG. 1a, and in the second preferred embodiment of the overhead projector according to the present invention shown in FIG. 1b, will be described hereinafter.

In FIG. 1b, there is shown a second preferred embodiment of the reflecting type overhead projector according to the present invention, in a fashion similar to FIG. 1a. In FIG. 1b, parts of the second preferred embodiment shown, which corresponds to parts of the first preferred embodiment shown in FIG. 1a, and which have the same functions, are designated by the same reference numerals and symbols as in that figure.

The only difference between this second embodiment and the first embodiment of the present invention shown in FIG. 1a is that in this second embodiment the photoelectric element 9, rather than being located under the reflecting table 2 just below a small hole 10 formed through said reflecting table 2 so that said photoelectric element 9 can receive light from above said reflecting table 2 through said small hole 10, is located in a position just to the side of the reflecting table 2. The advantage of this construction is that the amount of light received by said photoelectric element 9 from said light source lamp 5 is not affected by any irrelevant According to such a structure, this predetermined value is used as a threshold value. In the condition where the control circuit is supplying full power to said light source lamp, lighting said light source lamp more brightly, the intensity of light radiation then received by said photosensitive element with the light path between said light source lamp and said photosensitive element being substantially unobstructed is higher than a certain predetermined value. When, however, the operator of this overhead projector puts his hand down in between the light source lamp and the original, as for example to modify or to add to the original, then the intensity of light radiation received by said photosensitive element drops below said certain predetermined value, and therefore said control circuit now supplies part power to said light source lamp, lighting said light source lamp less brightly, and as a matter of course thereby the intensity of light radiation then received by said photosensitive element with the light path between said light source lamp and said photosensitive element still obstructed is less than said certain predetermined value, by even more. When, however, the operator of this overhead projector subsequently removes his hand from between the light source lamp and the original, then the intensity of light radiation received by said photosensitive element rises above said certain predetermined value, even though said light source lamp is only being operated at part power so as to light it less brightly; and therefore said control circuit now starts again to supply full power to said light source lamp, lighting said light source lamp more brightly. Of course thereby the intensity of light radiation then received by said photosensitive element with the light path between said light source lamp and said photosensitive element now obstructed now rises to more than said certain predetermined value, by even more.

Further, according to a particular aspect of the present invention, these and other objects are more particularly and concretely accomplished by such a reflecting type overhead projector of either of the types specified above, wherein said photosensitive element is located beside said reflecting table, light from said light source lamp being able to reach said photosensitive element without being intercepted by said reflecting table.

According to such a structure, the advantage is that the amount of light received by said photosensitive element from said light source lamp is not affected by any characteristics, such as opacity or reflectivity, of any part of the original lying over said photosensitive element, because in fact the original is not interposed between the photosensitive element and the light source lamp. However, the disadvantage of this structure is that the photosensitive element is not located at or near the center of the original, and hence is not quite so responsive to putting of the operator's hand in between the light source lamp and the original as it might be, although in practice in many cases this is not a major disadvantage.

Further, according to an alternative particular aspect of the present invention, these and other objects are more particularly and concretely accomplished by such a reflecting type overhead projector of either of the types earlier specified above, wherein said reflecting table is formed with a small hole through it, and wherein said photosensitive element is located on the side of said reflecting table remote from said light source lamp, light from said light source lamp being able to reach said photosensitive element by passing through said small hole in said reflecting table.

The advantage of this structure is that the photosensitive element may be located at or near a point directly under the center of the original, and hence is very accurately responsive to putting of the operator's hand in between the light source lamp and the original. According to such a structure, however, the disadvantage is that the amount of light received by said photosensitive element from said light source lamp may be somewhat affected by characteristics, such as opacity or reflectivity, of the part of the original that happens to lie over said photosensitive element opposing said small hole through said reflecting table, although in practice in many cases this is not a major disadvantage.

Further, according to a more particular aspect of the present invention, these and other objects are more particularly and concretely accomplished by a reflecting type overhead projector of any of the types specified above, wherein said control circuit, when supplying full power to said light source lamp and lighting said light source lamp more brightly, supplies both half wave portions of an alternating voltage supply to said light source lamp; but, when supplying part power to said light source lamp and lighting said light source lamp less brightly, supplies only one of said two half wave portions of said alternating voltage supply to said light source lamp.

According to such a structure, the control circuit can be simply and easily made by using a thyristor type of device, for example; and the reduction in the intensity of the light radiation emitted by said light source lamp is quite sufficient to ensure that the hand of the operator is not burned.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

In FIG. 2, there is shown the construction of the control circuit 12. This figure is applicable both to the first preferred embodiment shown in FIG. 1a and to the second preferred embodiment shown in FIG. 1b, since the construction of the control circuit 12 is identical in both of these two preferred embodiments. In FIG. 2, parts which correspond to parts of the first and second preferred embodiments shown in FIGS. 1a and 1b are designated by the same reference numerals and symbols as are used in those figures.

Figure 1A:
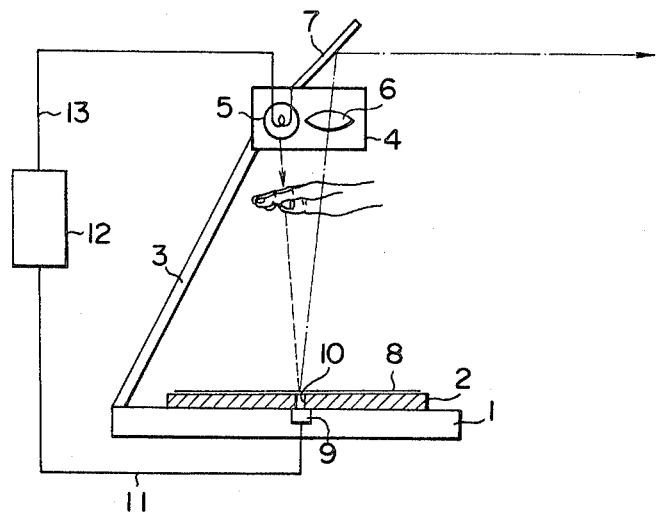
FIG. 1a is a schematic sectional view taken in a vertical plane through an overhead projector which is a first preferred embodiment of the present invention, in which first preferred embodiment a photoelectric element is located approximately at the center of a reflecting table.
Figure 1B:
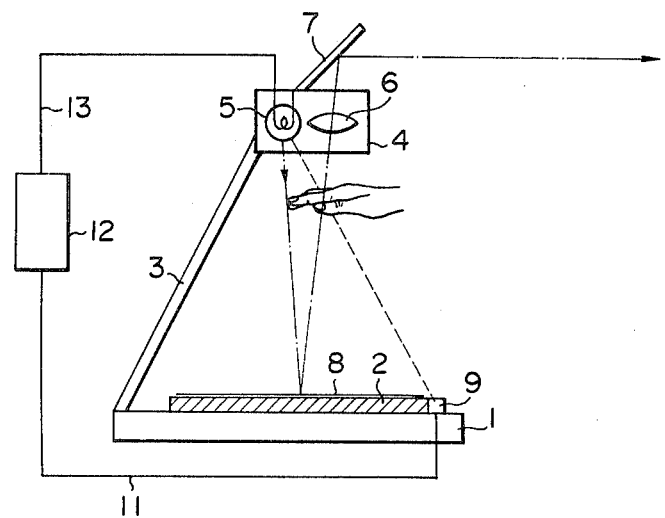
FIG. 1b is a schematic sectional view, similar to FIG. 1a, taken in a vertical plane through an overhead projector which is a second preferred embodiment of the present invention, in which second preferred embodiment a photoelectric element is located at the side of said reflecting table.
Figure 2:
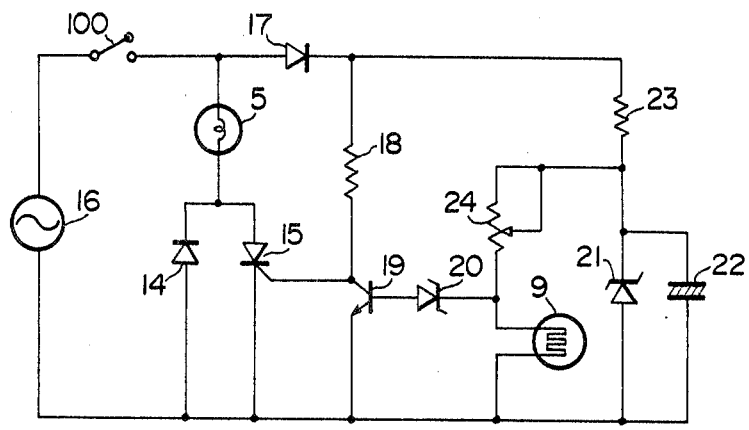
FIG. 2 is a circuit diagram of a light source lamp control circuit incorporating said photoelectric element, said circuit being usable in either of the first preferred embodiment of the overhead projector according to the present invention shown in FIG. 1a and the second preferred embodiment shown in FIG. 1b.

The light source lamp 5 is provided with alternating electrical power from an alternating electrical power source 16, through an ON/OFF switch 100 and through the parallel combination of a diode 14 and a thyristor 15, which are installed with opposite polarities. Thus, in any case, the light source lamp 5 is provided with that half wave of the alternating voltage from the alternating electrical power source 16 which can pass freely through the diode 14; and, if an only if the thyristor 15 is turned ON by supply of voltage to its control terminal, the light source lamp 5 is also provided with that half wave of the alternating voltage from the alternating electrical power source 16 which cannot pass freely through the diode 14. The control terminal of the thyristor 15 is provided with the voltage at a switched terminal of a transistor 19. As shown in the circuit diagram of FIG. 2, this switched terminal of the transistor 19 is also connected via a resistor 18 and a diode 17 to one side of the alternating electrical power source 16, while the other switched terminal of the transistor 19 is directly connected to the other side of said alternating electrical power source 16. Thus, when the two switched terminals of the transistor 19 are electrically communicated together according to supply of electrical voltage to the control terminal of said transistor 19, then the control terminal of the thyristor 15 is not provided with voltage, the thyristor 15 is left in the OFF state, and as explained above the light source lamp 5 is only provided with that half wave of the alternating voltage from the alternating electrical power source 16 which can pass freely through the diode 14. On the other hand, when the two switched terminals of the transistor 19 are electrically discommunicated from one another according to non supply of electrical voltage to the control terminal of said transistor 19, then the control terminal of the thyristor 15 is provided with voltage, the thyristor 15 is put into the ON state, and as explained above the light source lamp 5 is provided with both half waves of the alternating voltage from the alternating electrical power source 16.

The switching ON AND OFF of the transistor 19, i.e. the selective supply of electrical voltage to its control terminal, is performed by a circuit which includes a Zener diode 20 and the photoelectric element 9. A photoelectric cell such as a CdS cell has the electrical characteristic that its resistance decreases along with increase in the intensity of the light falling on it. Therefore, as will be understood by one skilled in the electronic art, based upon the disclosure herein, according to the function of the circuit in FIG. 2, when the direct voltage source for this circuit, which comprises a Zener diode 21, a capacitor 22, a resistor 23, and a variable resistor 24, has its variable resistor 24 set to a sutable value so as to adjust the voltage correctly, then: when the intensity of the light falling on the photoelectric element 9 drops below a certain predetermined value, i.e. when the resistance of said photoelectric element 9 rises above a certain predetermined resistance value, then the Zener diode 20 becoms conducting, the transistor 19 is switched ON by supply of voltage to its control terminal, and as explained above the control terminal of the thyristor 15 is not provided with voltage, the thyristor 15 is left in the OFF state, and as explained above the light source lamp 5 is only provided with that half wave of the alternating voltage from the alternating electrical power source 16 which can pass freely through the diode 14, and thus the light source lamp 5 is only dimly lit; but on the other hand, when the intensity of the light falling on the photoelectric element 9 rises above said certain predetermined value, i.e. when the resistance of said photoelectric element 9 drops below said certain predetermined resistance value, then the Zener diode 20 becomes nonconducting, the transistor 19 is switched OFF according to nonsupply of voltage to its control terminal, and as explained above the control terminal of the thyristor 15 is now provided with voltage, the thyristor 15 is put into the ON state, and as explained above the light source lamp 5 is now provided with both half waves of the alternating voltage from the alternating electrical power source 16.

Figure 3:
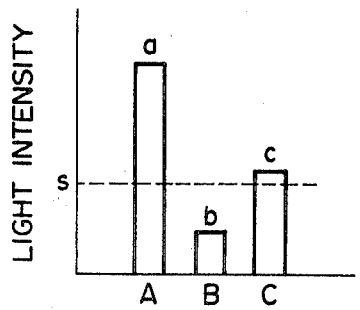
FIG. 3 is a histogram, showing values of light intensity in each of three different operating conditions of the characteristics, such as opacity or reflectivity, of any part of the original 8 lying over said photoelectric element 9, between said photoelectric element 9 and the light source lamp 5, because in fact the original 8 is not interposed between the photoelectric element 9 and the light source lamp 5. However, the disadvantage of this construction is that the photoelectric element 9 is not located at or near the center of the original 8, and hence is not quite so responsive to putting of the operator's hand in between the light source lamp 5 and the original 8 as it might be, although in practice in many cases this is not a major disadvantage, and burning of the operator's hand may be perfectly adequately avoided with this second embodiment.

In FIG. 3, there is shown a histogram, illustrating the intensity of light received by the photoelectric element 9, which is shown in the vertical direction, in three different operational conditions of the projector. The dashed line designated by s indicates the threshold level of light intensity, in other words, the level of light intensity falling on the photoelectric element 9, below which the transistor 19 is in the ON state, and above which the transistor 19 is in the OFF state. The case (A) illustrates when the control circuit 12 is providing full power to the light source lamp 5, i.e. is providing both half waves of the alternating voltage from the alternating electrical power source 16 to said light source lamp 5, and no substantial obstruction such as the hand of the projector operator is present between the light source lamp 5 and the photoelectric element 9. In this case, there is no danger of burning of the operator's hand, and it is required to provide a bright projected image on the screen, and according to this the level a of light intensity falling on the photoelectric element 9 is greater than the threshold level s, thus keeping the control circuit 12 in its state of providing full power to the light source lamp 5. The case (B) illustrates when the control circuit 12 is providing full power to the light source lamp 5, i.e. is providing both half waves of the alternating voltage from the alternating electrical power source 16 to said light source lamp 5, and a substantial obstruction such as the hand of the projector operator has just been inserted between the light source lamp 5 and the photoelectric element 9. In this case, there is a significant danger of burning of the operator's hand, and it is desirable to reduce the intensity of illumination of the original 8 and of the operator's hand, irrespective of the brightness ofthe projected image on the screen (which in any case is not very relevant at this time, since this image is being interfered with by the operator's hand), and according to this the level b of light intensity falling on the photoelectric element 9 is now less than the threshold level s, thus causing the control circuit 12, as explained above, to transit to its state of providing only part power to the light source lamp 5. Finally, the case (C) illustrates when the control circuit 12 is providing part power to the light source lamp 5, i.e. is providing only one half wave of the alternating voltage fom the alternating electrical power source 16 to said light source lamp 5, and the obstruction such as the hand of the projector operator is not present (i.e. has been removed, in fact, from) between the light source lamp 5 and the photoelectric element 9. In this case, the previous danger of burning of the operator's hand has now passed, and it is now again required to provide a bright projected image on the screen, and according to this the level c of light intensity falling on the photoelectric element 9 is now greater than the threshold level s, thus causing the control circuit 12, as explained above, to transit to its state of providing full power to the light source lamp 5. It should be particularly noted that it is necessary for this level c of light intensity falling on the photoelectric element 9 when the light source lamp 5 is being operated at part power and no obstruction is present between said light source lamp 5 and the photoelectric element 9 to be higher than the threshold level s, in this particular type of implementation of the present invention, for the control circuit to start again to supply full power to said light source lamp 5, when the obstruction such as the operator's hand is removed.

Figure 4:
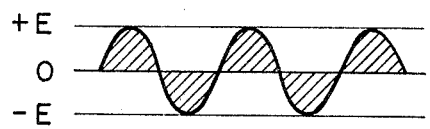
Figure 5:
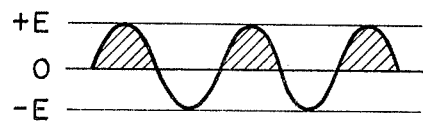

In FIG. 4, there is shown an illustration of the wave form of the alternating voltage supply from the alternating electrical power source 16, with the portions of said wave form which are supplied to the light source lamp 5 when the light source lamp 5 is being operated at full power shaded. In fact, in this operational condition, said alternating voltage is being supplied to the light source lamp 5 at all times. On the other hand, in FIG. 5, there is shown an illustration of the wave form of the alternating voltage supply from the alternating electrical power source 16, with the portions of said wave form which are supplied to the light source lamp 5 when the light source lamp 5 is being operated at part full power shaded. In fact, in this operational condition, said alternating voltage is being supplied to the light source lamp 5 substantially for half the time. Thus, in this operational condition, the light source lamp 5 operates rather dimly.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For instance, it is not essential that in the shown large scale construction of the present invention the control circuit 12 should operate by simply considering a single threshold value of illumination of the photoelectric element 9, since more complicated structures could be considered; nor is it essential that the dimming of the light source lamp 5 should be performed by providing only one half wave of an alternating power supply to it, by thyristor switching, although this is convenient. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. A reflecting type overhead projector, for projecting an image of an at least partly transparent original upon a screen, comprising:
    a reflecting table for placing said original thereupon;
    a light source lamp for projecting light rays towards said reflecting table, for illuminating said original when it is thus placed upon said reflecting table;
    a projection lens for projecting an image of said original, when it is thus placed upon said reflecting table and illuminated by said light source lamp, upon said screen;
    a photosensitive element in the vicinity of said reflecting table for responding to the intensity of light rays which said photosensitive element receives from said light source lamp;
    and a control circuit which receives a signal from said photosensitive element, and which controls the intensity of the light emitted by said light source lamp; and which, when said light source lamp is being supplied with full power so as to light it more brightly, and then the intensity of light radiation received by said photosensitive element drops substantially, supplies part power to said light source lamp so as to light it less brightly; and, when said light source lamp is being supplied with part power so as to light it less brightly, and then the intensity of light radiation received by said photosensitive element rises substantially, supplies full power to said light source lamp so as to light it more brightly.

2. A reflecting type overhead projector, for projecting an image of an at least partly transparent original upon a screen, comprising:
    a reflecting table for placing siad original upon;
    a light source lamp for projecting light rays towards said reflecting table, for illuminating said original when it is thus placed upon said reflecting table;
    a projection lens for projecting an image of said original, when it is thus placed upon said reflecting table and illuminated by said light source lamp, upon said screen;
    a photosensitive element in the vicinity of said reflecting table for responding to the intensity of light rays which said photosensitive element receives from said light source lamp;
    and a control circuit which receives a signal from said photosensitive element, and which controls the intensity of the light emitted by said light source lamp; said control circuit supplying full or part power to said light source lamp, lighting said light source lamp more or less brightly, respectively, when the intensity of light radiation received by said photosensitive element is higher than a certain predetermined value, or drops to less than said certain predetermined value.

3. A reflecting type overhead projector according to either one of claim 1 or claim 2, wherein said photosensitive element is located beside said reflecting table, light from said light source lamp being able to reach said photosensitive element without being intercepted by said reflecting table.

4. A reflecting type overhead projector according to either one of claim 1 or claim 2, wherein said reflecting table is formed with a small hole through it, and wherein said photosensitive element is located on the side of said reflecting table remote from said light source lamp, light from said light source lamp being able to reach said photosensitive element by passing through said small hole in said reflecting table.

5. A reflecting type overhead projector according to either one of claim 1 or claim 2, and further including an alternating voltage supply operatively connected to said control circuit, said control circuit, when supplying full power to said light source lamp and lighting said light source lamp more brightly, supplies both half wave portions of said alternating voltage supply to said light source lamp; but, when supplying part power to said light source lamp and lighting said light source lamp less brightly, supplies only one of said two half wave portions of said alternating voltage supply to said light source lamp.

6. A reflecting type overhead projector according to claim 3, and further including an alternating voltage supply operatively connected to said control circuit, said control circuit, when supplying full power to said light source lamp and lighting said light source lamp more brightly, supplies both half wave portions of said alternating voltage supply to said light source lamp; but, when supplying part power to said light source lamp and lighting said light source lamp less brightly, supplies only one of said two half wave portions of said alternating voltage supply to said light source lamp.

7. A reflecting type overhead projector according to claim 4, and further including an alternating voltage supply operatively connected to said control circuit, said control circuit, when supplying full power to said light source lamp and lighting said light source lamp more brightly, supplies both half wave portions of said alternating voltage supply to said light source lamp; but, when supplying part power to said light source lamp and lighting said light source lamp less brightly, supplies only one of said two half wave portions of said alternating voltage supply to said light source lamp.

* * * * *